United States Patent [19]
Arthur

[11] 3,746,167
[45] July 17, 1973

[54] METHOD AND APPARATUS FOR DETERMINING THE AMOUNT OF SETTLEABLE AND SUSPENDED SOLIDS IN A LIQUID

[76] Inventor: Robert M. Arthur, c/o Arthur and Associates, Inc., P. O. Box 1222, Fond DuLac, Ind. 54935

[22] Filed: Sept. 28, 1971

[21] Appl. No.: 184,374

[52] U.S. Cl.......................... 210/70, 210/86, 210/87
[51] Int. Cl............................................. B01d 23/20
[58] Field of Search .................. 210/70, 87, 86, 73, 210/88, 89, 93, 416

[56] References Cited
UNITED STATES PATENTS

| | | | |
|---|---|---|---|
| 3,055,208 | 9/1962 | Gallus............................. | 210/416 X |
| 1,227,107 | 5/1917 | Blomfield............................... | 210/86 |
| 3,424,311 | 1/1969 | Siedenbuag........................... | 210/86 |
| 3,160,000 | 12/1964 | Mosher............................ | 210/416 X |
| 3,655,052 | 4/1972 | Friederichs........................ | 210/93 X |

Primary Examiner—John Adee
Attorney—Morton, Bernard, Brown, Roberts & Sutherland

[57] ABSTRACT

A method of and an apparatus for determining the amount of settleable and suspended solids in a liquid. A sample of the liquid is passed to a filtration chamber. The rate of flow of the sample through the filter is monitored and recorded, and from that rate of flow, the amount of settleable and suspended solids in the liquid is determined. If a relatively high concentration of settleable solids is present, the sample can be allowed to stand in the filtration chamber for a preset time before passage through the filter to permit sedimentation to take place.

18 Claims, 8 Drawing Figures

Patented July 17, 1973 3,746,167
2 Sheets-Sheet 1
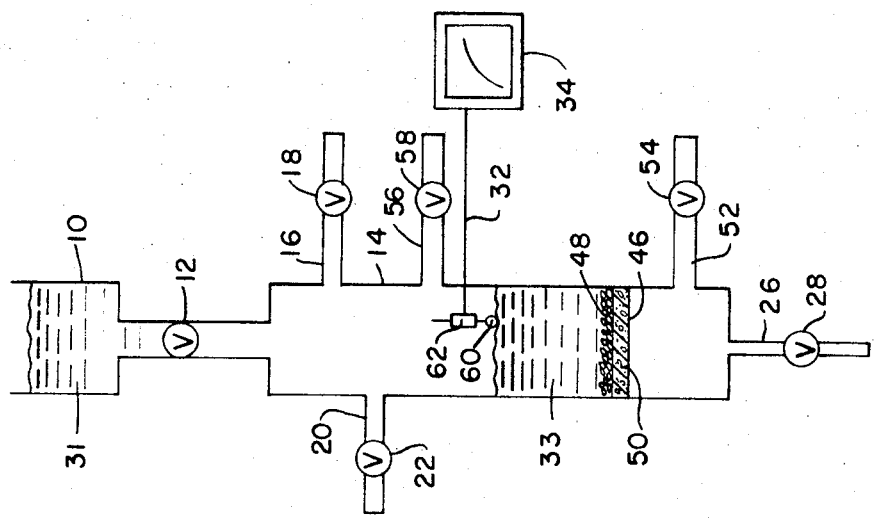
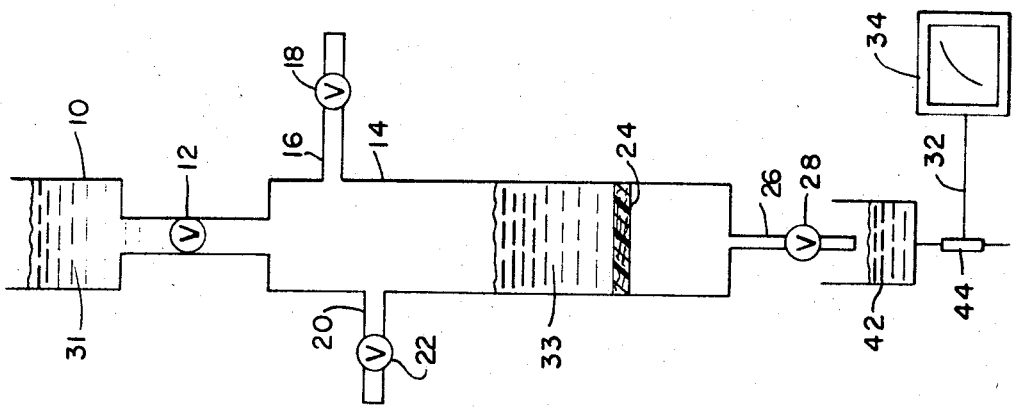
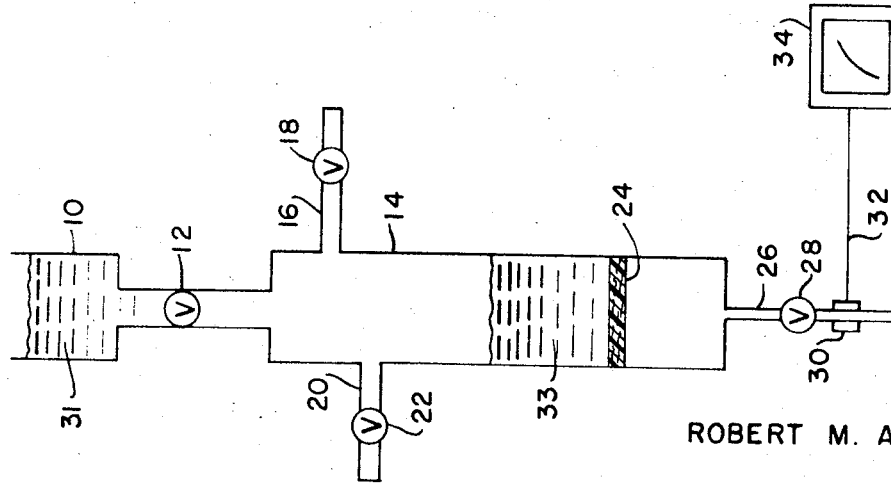
INVENTOR
ROBERT M. ARTHUR
BY
Morton, Bernard, Brown, Roberts & Sutherland
ATTORNEYS

INVENTOR
ROBERT M. ARTHUR

METHOD AND APPARATUS FOR DETERMINING THE AMOUNT OF SETTLEABLE AND SUSPENDED SOLIDS IN A LIQUID

The present invention pertains to the determination of the amount of solids within a liquid. More particularly, the present invention pertains to a method of and an apparatus for determining the amount of both settleable solids and suspended solids within a liquid.

The concentration of settleable and suspended solids in wastewater are important factors in water pollution control. In waste treatment plants, settleable solids are removed in sedimentation tanks. The sludge collected on the bottom of the tank must be treated and disposed of by biological or physical-chemical methods. A knowledge of the concentration of settleable solids is therefore important in wastewater treatment plant operation. In stream pollution, settleable solids can create sludge banks which are a hazard to navigation, create odors, unsightly conditions and are generally undesirable. A knowledge of the concentration of settleable solids in effluents discharging to streams is therefore important.

A knowledge of the concentration of suspended solids is equally important in wastewater treatment plant operation. Since suspended solids do not settle out in sedimentation tanks, additional biological or physical-chemical methods must be used to remove these solids from the water. Large concentrations of suspended solids are undesirable in stream pollution control. They cause unsightly conditions and prevent the penetration of sunlight required for plant growth. The concentration of suspended solids is generally used as an indication of the strength of sewage in establishing rates to implement a sewer service ordinance and to determine the efficiency of waste treatment plant operation.

Because of the importance of both settleable and suspended solids there is interest in automating the laboratory tests or in developing on-line methods of analysis. Most such attempts have been concerned with measuring the concentration of suspended solids and have generally related to the measurement of turbidity of the sample.

Present laboratory methods of determining settleable solids usually consist of measuring the volume of solids which settle to the bottom of a container after a period of time. A suitable container is filled with a specified volume of the thoroughly mixed sample. After a specified time period, the volume of settleable matter in the bottom of a container is recorded as the volume of settleable solids. In a commonly accepted standard method, the volume of the sample is one liter and the time for settling is one hour.

The method of determining suspended solids in the laboratory generally consists of weighing the solids which remain on a filter after vacuum filtration of the sample. The filter usually consists of glass fiber, a porous membrane, or an asbestos mat. The filter and holder are dried and their initial weight recorded. A suitable volume of the sample is filtered by applying suction to the holder, and the suspended solids remain on the filter. The filter and holder are then dried and weighed. The difference in the initial and final weights is the weight of suspended solids. In a standard method, glass fiber filters are specified and the volume of sample must be 14 ML or over per sq. cm. of filter area.

The present invention concerns a method and apparatus for determining the concentration of settleable and suspended solids within a liquid, either on a batch basis or during continuous flow. In accordance with the present invention, the liquid having the solids therein is passed into a filtration chamber including a filter through which the liquid generally will not pass under gravity. A pressurized gas such as air is then introduced to force the liquid through the filter. The quantity of filtrate passed by the filter is monitored and automatically recorded to produce a graph from which can be determined characteristics that indicate the concentration of settleable and suspended solids within the liquid. For continuous flow operation, a number of filtration chambers are provided so that a number of such readings can be made, spaced over a period of time.

These and other aspects and advantages of the present invention are more apparent in the following detailed description and claims, particularly when considered in conjunction with the accompanying drawings in which like parts bear like reference numerals. In the drawings:

FIG. 1 is a schematic representation of a first embodiment of apparatus in accordance with the present invention;

FIGS. 5 and 6 are schematic representations of additional embodiments of apparatus in accordance with the present invention.

Figure 2:
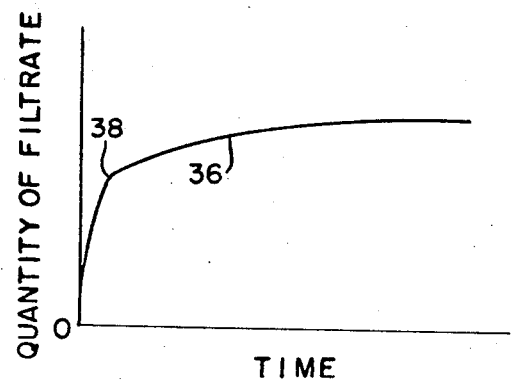
FIGS. 2 and 3 are graphs depicting filtration rates of liquid samples with different types of solid therein.

As depicted in FIG. 1, sample collection chamber 10 is connected by means of valve 12 to filtration chamber 14. Vent line 16 is connected near the upper end of filtration chamber 14 and includes valve 18. Pressurized gas inlet line 20 is likewise connected near the upper end of filtration chamber 14 and includes valve 22. Filter medium 24 is located near the lower end of filtration chamber 14 and lies across substantially the full area of the filtration chamber so that to pass from the top of the chamber to the bottom, all liquid must flow through the filter medium. Discharge line 26 is connected to the bottom of filtration chamber 14 beneath filter medium 24 and includes valve 28. Adjacent discharge line 26 and downstream of valve 28 is positioned means 30 for measuring the rate of flow of liquid through discharge line 26. By way of example, this might be a magnetic flow meter as depicted in FIG. 1. The output signal from flow meter 30 is coupled by line 32 to display device 34 such as a graphical recorder.

To determine the characteristics of settleable and suspended solids within a liquid, a sample 31 of the liquid is introduced into sample collection chamber 10 with valve 12 closed. Valves 22 and 28 are then closed following which valves 12 and 18 are opened. The sample flows from sample collection chamber 10 through valve 12 into filtration chamber 14 in which it is supported above filter medium 24, as depicted at 33. Valves 12 and 18 are then closed and valves 22 and 28 opened. Pressurized gas such as pressurized air passes through valve 22 to force the sample 33 through filter medium 24. Settleable and suspended solids collect on filter medium 24 as the sample passes therethrough. The filtrate leaves the bottom of filtration chamber 14 through outlet line 26 and valve 28. Flow meter 30 determines the quantity of filtrate passed by filter medium 24 and applies a signal indicative thereof via line 32 to recorder 34. Recorder 34 therefore makes a record of the quantity of filtrate passed by filter medium 24 over a period of time. This quantity may be expressed as volume of filtrate or preferably as weight of filtrate. If the output of flow meter 30 is a signal indicative of the filtrate flow rate rather than of the filtrate quantity, then, if desired, the flow meter output signal can be integrated to provide to recorder 34 a signal indicative of the filtrate quantity.

Figure 3:
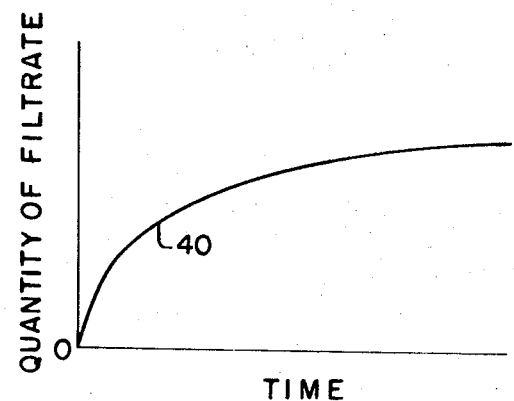

FIGS. 2 and 3 depict graphs of the type made by recorder 34. Curve 36 in FIG. 2 is representative of a liquid sample containing a relatively high concentration of settleable solids. The rate of filtration is fairly rapid at first, but as filter medium 24 becomes covered with solids, the rate of filtration decreases substantially at point 38. Curve 40 in FIG. 3 is representative of a sample having a lower concentration of settleable solids and a higher concentration of suspended solids. In curve 40, there is no sudden change in filtration rate such as occurs at point 38 of curve 36. Thus, it is seen that from the curves made by graphical recorder 34, the concentration of settleable solids and the concentration of suspended solids can be studied.

To obtain further information about settleable and suspended solids within the sample, the sample from collection chamber 10 is passed through valve 12 into filtration 14 with vent valve 18 opened as before, following which the sample is permitted to stand within filtration chamber 14 for a period of time such as thirty minutes prior to the closing of valves 12 and 18 and the opening of valves 22 and 28 to cause the sample to flow through the filter medium 24. This permits sedimentation to take place and is particularly useful with samples having a high concentration of solids which settle rapidly.

Figure 4:
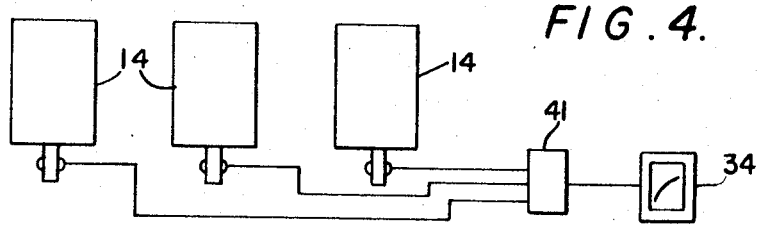
FIG. 4 is a schematic representation of an embodiment of apparatus in accordance with the present invention suitable for substantially continuous flow monitoring of liquids.

Filter medium 24 is preferably a glass fiber filter pad or a membrane filter. Such filters can only be used once, and so as depicted in FIG. 4, for continuous batch flow operation, a plurality of filtration chambers 14, each having a filter medium therein, are utilized to provide a considerable number of readings over a period of time. By way of example, twenty-four filtration chambers 14 can be provided with their outputs coupled via switching unit 41 to recorder 34 to permit hourly indications of the concentration of solids within the liquid.

FIG. 5 illustrates a slightly modified embodiment of apparatus in accordance with the present invention. The sample collection chamber 10, filtration chamber 14, filter medium 24, lines 16, 20 and 26, and valves 12, 18, 22 and 28 depicted in FIG. 5 are the same as those depicted in FIG. 1. Rather than utilizing flow meter 30, however, the filtrate is discharged from pipe 26 through valve 28 to filtrate collection container 42 which includes suitable means for weighing the filtrate. By way of example, filtrate collection container 42 can be positioned on a balance with a linear differential transformer 44 connected thereto to detect movement of filtrate collection chamber 42 due to the weight of the filtrate. Transformer 44 applies a signal indicative of the filtrate weight or volume via line 32 to recorder 34.

FIG. 6 illustrates an embodiment of apparatus in accordance with the present invention and including further modifications. Sample collection chamber 10, filtration chamber 14, lines 16, 20, and 26, and valves 12, 18, 22, and 28 are identical with those of the apparatus of FIG. 1. A particulate filter medium 46 is positioned within filtration chamber 14 near the lower end thereof. Particulate filter medium 46 might include a sand or diatomaceous earth filtering substance 48 supported on a porous disc 50. Backwash inlet line 52 is connected to filtration chamber 14 beneath filter medium 46 and includes valve 54. Backwash outlet line 56 connects to filtration chamber 14 near the top thereof and includes valve 58. After a sample of liquid has been passed through the apparatus as described above with reference to FIG. 1, valves 12, 18, 22 and 28 are closed, and valves 54 and 58 are opened permitting backwash liquid such as water to flow in line 52, up through filter medium 46, and out line 56, washing the solids from filter medium 46 in preparation for another run.

FIG. 6 additionally illustrates a further embodiment of means in accordance with the present invention for sensing the quantity of filtrate passed through the filter medium. Float 60 is positioned to float on the surface of the sample 33 within filtration chamber 14. Float 60 is connected to a level sensing device 62, such as a resistance measuring device or such as a linear differential transformer, the output of which is coupled by line 32 to recorder 34. As sample 33 passes through filter medium 24 or 46, the level of sample 33 drops, and float 60 drops. This movement is sensed by level sensing device 62, the output of which is applied to recorder 34 as an indication of filtrate quantity.

Figure 7:
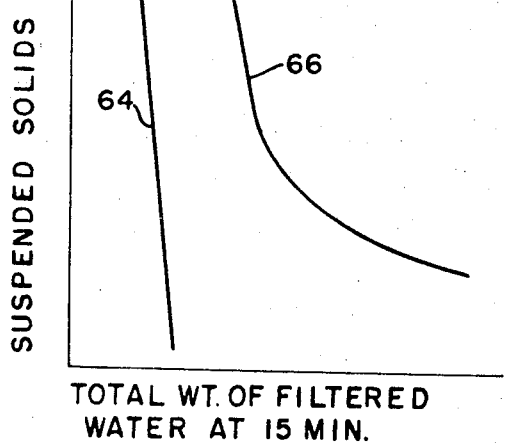
FIGS. 7 and 8 are graphs comparing the determination of information about suspended solids within the liquid in accordance with the present invention and in accordance with a previously used method.
Figure 8:
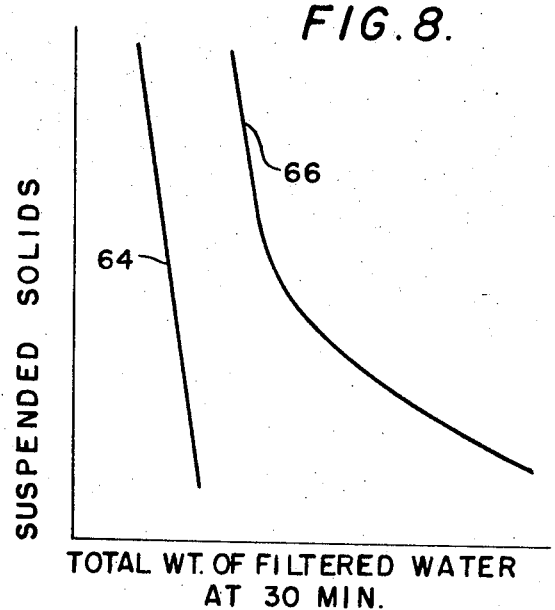

FIG. 7 depicts a graphical representation 64 of the concentration of suspended solids within a sample of liquid as found by using a Gooch crucible with a glass fiber filter and also depicts a graphical representation 66 of the quantity of filtrate from a sample of the same liquid as passed by apparatus in accordance with the present invention. Both representations depict data after fifteen minutes of flow. FIG. 8 is a similar set of graphical representations 64 and 66 for a thirty minute time period. It is to be noted that correlation between the two approaches is present.

Although the present invention has been disclosed with reference to preferred embodiments, numerous alterations and modifications could be made, and still the result would be within the scope of the invention.

I claim:

1. A method of monitoring the concentration of settleable and suspended solids in water from a water treatment plant comprising:
   a. applying a sample of the water to a filtration chamber having a filter therein;
   b. passing the water through the filter;
   c. continuously and automatically monitoring the flow of filtrate through the filter;
   d. continuously recording the quantity of filtrate passed through the filter as a continuous function of time; and
   e. monitoring the continuous record of the quantity of filtrate to observe therein any substantial decrease in the rate of flow of filtrate which would be indicative of a relatively high concentration of settleable solids in the water.

2. A method as claimed in claim 1 in which the flow of filtrate through the filter is monitored by sensing the rate of flow of filtrate leaving the filtration chamber.

3. A method as claimed in claim 1 in which the flow of filtrate through the filter is monitored by continuously weighing the filtrate that has been passed through the filter.

4. A method as claimed in claim 1 in which the flow of filtrate through the filter is monitored by continuously monitoring the level of liquid within the filtration chamber prior to passage through the filter.

5. A method as claimed in claim 1 further comprising between steps (a) and (b) the additional step of allowing the water to stand in the filtration chamber a preset time to allow sedimentation of settleable solids.

6. Apparatus for continuously monitoring the settleable and suspended solids in water from a water treatment plant comprising:
   a. a filtration chamber having a filter medium therein, having an inlet, and having an outlet and adapted to hold a sample of water;
   b. automatic and continuous monitoring means for continuously and automatically monitoring the flow of water through the filter medium to provide a continuous signal indicative of the flow of filtrate through the filter medium; and
   c. continuous recording means connected to said monitoring means to provide a continuous permanent record of the quantity of filtrate passed through the filter medium as a continuous function of time.

7. Apparatus as claimed in claim 6 in which the recording means is a graphical recorder providing a record of the quantity of filtrate passed through the filter medium as a function of time.

8. Apparatus as claimed in claim 6 in which the monitoring means comprises flow meter means for measuring the quantity of flow of filtrate passing through the filtration chamber outlet after passage through the filter medium.

9. Apparatus as claimed in claim 6 in which the monitoring means comprises weighing means for weighing the filtrate passed through the filtration chamber outlet after passage through the filter medium.

10. Apparatus as claimed in claim 9 in which the weighing means includes a linear differential transformer for providing a signal indicative of the weight of filtrate passed through the filter medium.

11. Apparatus as claimed in claim 6 in which the monitoring means comprises level sensing means for sensing the level of water within the filtration chamber before passage through the filter medium.

12. Apparatus as claimed in claim 11 in which the level sensing means includes float means for floating on the surface of water within the filtration chamber before passage through the filter medium and displacement monitoring means for providing a signal indicative of the height of water within the filtration chamber before passage through the filter medium.

13. Apparatus as claimed in claim 12 in which the linear displacement monitoring means is a linear differential transformer.

14. Apparatus as claimed in claim 6 in which the filter medium includes a glass fiber filter pad and means for supporting the glass fiber filter pad within the filtration chamber.

15. Apparatus as claimed in claim 6 in which the filter medium includes a particulate filter medium and in which the filtration chamber includes a backwash inlet and a backwash outlet to permit backwash liquid to flow through the particulate filter medium.

16. Apparatus as claimed in claim 15 in which the particulate filter medium includes a porous disc connected within the filter chamber and sand upon the porous disc.

17. Apparatus as claimed in claim 15 in which the particulate filter medium includes a porous disc connected within the filter chamber and diatomaceous earth upon the porous disc.

18. Apparatus as claimed in claim 6 further comprising a plurality of additional filtration chambers each having a filter medium therein, having an inlet, and having an outlet, said monitoring means continuously and automatically monitoring the flow of water through the filter medium in each filtration chamber.

* * * * *